(12) United States Patent
Guard

(10) Patent No.: US 8,947,105 B2
(45) Date of Patent: Feb. 3, 2015

(54) CAPACITIVE COUPLING OF BOND PADS

(75) Inventor: David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 564 days.

(21) Appl. No.: 13/309,456

(22) Filed: Dec. 1, 2011

(65) Prior Publication Data

US 2013/0141118 A1   Jun. 6, 2013

(51) Int. Cl.
*G06F 3/044* (2006.01)

(52) U.S. Cl.
CPC ...... *G06F 3/044* (2013.01); *G06F 2203/04112* (2013.01)
USPC .......................................... 324/658; 345/173

(58) Field of Classification Search
CPC ............................................. G06F 2203/04112
USPC ....................................................... 324/658
See application file for complete search history.

(56) References Cited

U.S. PATENT DOCUMENTS

| | | | |
|---|---|---|---|
| 5,325,442 A * | 6/1994 | Knapp | 382/124 |
| 5,887,343 A * | 3/1999 | Salatino et al. | 29/833 |
| 7,663,607 B2 | 2/2010 | Hotelling | |
| 7,875,814 B2 | 1/2011 | Chen | |
| 7,920,129 B2 | 4/2011 | Hotelling | |
| 8,026,903 B2 * | 9/2011 | Hamblin et al. | 345/173 |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,421,890 B2 * | 4/2013 | Benkley, III | 348/294 |
| 2006/0105467 A1 * | 5/2006 | Niksa et al. | 436/150 |
| 2009/0315854 A1 | 12/2009 | Matsuo | |
| 2010/0220075 A1 * | 9/2010 | Kuo et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0256642 A1 * | 10/2012 | Badaye et al. | 324/658 |
| 2013/0076612 A1 | 3/2013 | Myers | |

FOREIGN PATENT DOCUMENTS

WO   WO 2012/129247   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Jeff Natalini
(74) *Attorney, Agent, or Firm* — Baker Botts LLP

(57) ABSTRACT

In one embodiment, a system includes a touch sensor comprising a first set of electrodes and a first set of bond pads electrically coupled to the first set of electrodes. The system also includes a second set of bond pads capacitively coupled to the first set of bond pads. Each bond pad of the second set of bond pads is coincident with a bond pad of the first set of bond pads. The system also includes a circuit electrically coupled to the second set of bond pads such that signals may be communicated from the first set of bond pads to the circuit.

14 Claims, 2 Drawing Sheets

CAPACITIVE COUPLING OF BOND PADS

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

In some aspects of touch-sensor technology, touch sensors that detect touch input include bond pads. Bond pads provide an interface to one or more component that process signals detected by touch sensors (e.g., dual-sided sensors), such as flexible printed circuits (FPC). Aspects of such components (such as a bond area of an FPC) have been placed between touch sensors and the screen itself and, as a result, have led to certain problems. One such problem is that moisture ingress may occur due to gaps being present between the screen and the touch sensor. Another problem that may arise is that multiple bonding operations must be performed when coupling dual-sided touch sensors to components like an FPC causing increased expense. Yet another problem that may arise is that bonding a dual-sided sensor to a component such as an FPC may cause creases that can damage touch sensors.

DESCRIPTION OF EXAMPLE EMBODIMENTS

Figure 1:
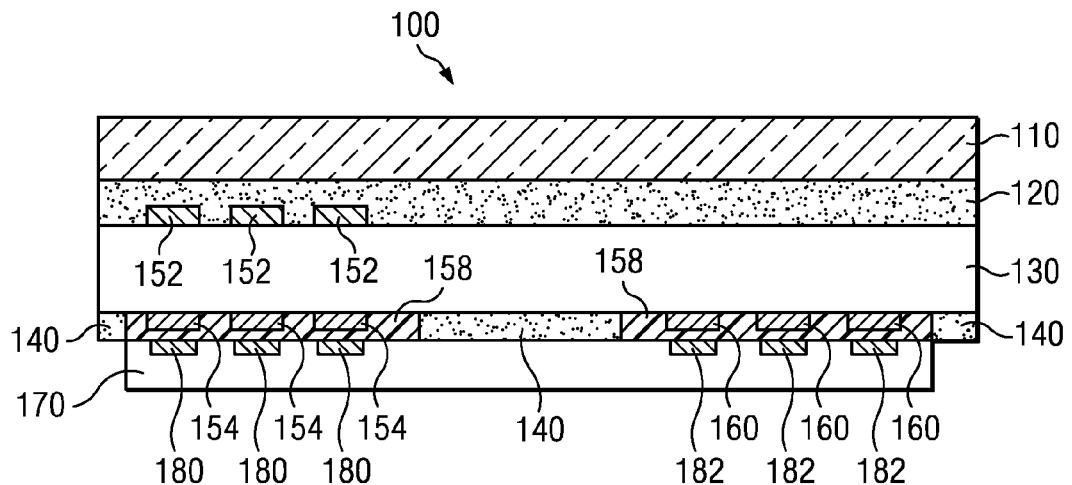
FIG. 1 illustrates one embodiment of a system used in a touch screen device including capacitively coupled bond pads.

FIG. 1 illustrates one embodiment of system 100 used in a touch-screen device including capacitively coupled bond pads. System 100 includes touch sensor 130. Coupled to touch sensor 130 are bond pads 152, 154, and 160. Cover 110 is coupled to touch sensor 130 via adhesive 120. Circuit 170 may be electrically coupled to bond pads 154 and 160 using bond pads 180 and 182, respectively. In some embodiments, touch sensor 130 may be configured to detect touches (e.g., capacitively, the touches performed by one or more fingers or a stylus) on cover 110 and produce signals indicative of the detection. Bond pads 160 may be electrically coupled to aspects of touch sensor 130 (such as electrodes) that are aligned in one axis (e.g., the x-axis) and bond pads 152 may be electrically coupled to aspects of touch sensor 130 (such as electrodes) that are aligned in a different axis (e.g., the y-axis). Bond pads 154 may be capacitively coupled to bond pads 152 and may thereby receive signals from bond pads 152 and provide them to circuit 170. Bond pads 160 may also provide signals to circuit 170.

In some embodiments, cover 110 may include material that allows for capacitive detection of touches on cover 110. For example, cover 110 may be made of a resilient material suitable for repeated touching such as, e.g., glass, polycarbonate, or poly(methyl methacrylate) (PMMA). Cover 110 may be clear, opaque, or may have one or more levels of suitable opacities. As an example only and not by way of limitation, cover 110 may have a thickness of approximately 1 mm. This disclosure contemplates any suitable cover made of any suitable material.

In some embodiments, adhesives 120 and/or 140 may be formed of Optically Clear Adhesives (OCA). Adhesives that have other levels of opacities other than optically clear may be used to implement adhesives 120 and/or 140. Adhesives 120 and 140 may be composed of suitable material (or combination of materials) that effectively attach touch sensor 130 to cover 110 and circuit 170. As an example only and not by way of limitation, adhesives 120 and 140 may each have a thickness of approximately 0.05 mm.

In some embodiments, bond pads 180 and 182 of circuit 170 may be coupled to bond pads 154 and 160 using film 158. Film 158 may be electrically conductive and may facilitate the adhering of bond pads 180 and 182 to bond pads 154 and 160. As examples, film 158 may be implemented using Anisotropic Conduction Film (ACF) or anisotropic conduction paste (ACP).

In some embodiments, touch sensor 130 may include one or more electrodes that are configured to detect touches on the surface of cover 110. Touch sensor 130 may be a single-sided touch sensor or a double-sided touch sensor, such as a double-sided FLM (fine line metal) touch sensor. For example, touch sensor 130 may be configured such that electrodes aligned in one axis (e.g., the y-axis) may be present on one surface of touch sensor 130 and electrodes aligned in a different axis (e.g., the x-axis) may be present on another surface of touch sensor 130. As another example, touch sensor 130 may be configured such that electrodes aligned in one axis (e.g., the y-axis) may be present on the same surface of touch sensor 130 (e.g., the surface that faces cover 110) as electrodes aligned in a different axis (e.g., the x-axis).

One or more portions of the substrate of touch sensor 130 may be made of polyethylene terephthalate (PET) or another suitable material. This disclosure contemplates any suitable substrate with any suitable portions made of any suitable material. In particular embodiments, the drive or sense electrodes in touch sensor 130 may be made of indium tin oxide (ITO) in whole or in part. In particular embodiments, the drive or sense electrodes in touch sensor 130 may be made of fine lines of metal or other conductive material. As an example and not by way of limitation, one or more portions of the conductive material may be copper or copper-based and have a thickness of approximately 2 μm or less and a width of approximately 5 μm or less. As another example, one or more portions of the conductive material may be silver or silver-based and similarly have a thickness of approximately 5 μm or less and a width of approximately 10 µm or less. This disclosure contemplates any suitable electrodes made of any suitable material.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (such as for example copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

Touch sensor 130 may implement a capacitive form of touch sensing. In a mutual-capacitance implementation, touch sensor 130 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other through the dielectric material separating them. A pulsed or alternating voltage applied to the drive electrode may induce a charge on the sense electrode, and the amount of charge induced may be susceptible to external influence (such as a touch or the proximity of an object). When an object touches or comes within proximity of the capacitive node, a change in capacitance may occur at the capacitive node and a controller (not depicted in FIG. 1) may measure the change in capacitance. By measuring changes in capacitance throughout the array, the controller may determine the position of the touch or proximity within the touch-sensitive area(s) of touch sensor 130.

In a self-capacitance implementation, touch sensor 130 may include an array of electrodes of a single type that may each form a capacitive node. When an object touches or comes within proximity of the capacitive node, a change in self-capacitance may occur at the capacitive node and a controller may measure the change in capacitance, for example, as a change in the amount of charge needed to raise the voltage at the capacitive node by a pre-determined amount. As with a mutual-capacitance implementation, by measuring changes in capacitance throughout the array, the controller may determine the position of the touch or proximity within the touch-sensitive area(s) of touch sensor 130. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 130 may have drive electrodes disposed in a pattern on one side of a substrate and sense electrodes disposed in a pattern on another side of the substrate or both the drive electrodes and the sense electrodes may be in patterns on the same side of touch sensor 130 (e.g., when touch sensor 130 is implemented as a single-sided touch sensor). An intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes.

In some embodiments, circuit 170 may be implemented using a flexible printed circuit. Any suitable set of materials and/or components may be used to implement circuit 170 that allows for the provision of signals to touch sensor 130 (via bond pads 152, 154, and 160) and the reception of signals from touch sensor 130 (via bond pads 152, 154, and 160). Circuit 170 may be coupled to other components, subsystems, or systems (not depicted in FIG. 1) that may determine signals to be transmitted to touch sensor 130 and/or that may determine how signals received from touch sensor 130 are processed.

As described above, a change in capacitance at a capacitive node of touch sensor 130 may indicate a touch or proximity input at the position of the capacitive node. A controller may detect and process the change in capacitance to determine the presence and location of the touch or proximity input. The controller may then communicate information about the touch or proximity input to one or more other components (such one or more central processing units (CPUs) or digital signal processors (DSPs)) of a device that includes touch sensor 130, which may respond to the touch or proximity input by initiating a function of the device (or an application running on the device) associated with it. Although this disclosure describes a particular controller having particular functionality with respect to a particular device and a particular touch touch sensor, this disclosure contemplates any suitable controller having any suitable functionality with respect to any suitable device and any suitable touch sensor.

In some embodiments, tracks of conductive material disposed on the substrate of touch sensor 130 may couple the drive or sense electrodes of touch sensor 130 to bond pads 152 and 160, also disposed on the substrate of touch sensor 130. Tracks may extend into or around (e.g. at the edges of) the touch-sensitive area(s) of touch sensor 130. Particular tracks may provide drive connections for coupling circuit 170 to drive electrodes of touch sensor 130, through which circuit 170 may supply drive signals to the drive electrodes. Other tracks may provide sense connections for coupling circuit 170 to sense electrodes of touch sensor 130, through which charge at the capacitive nodes of touch sensor 130 may be sensed. Tracks may be made of fine lines of metal or other conductive material. As an example and not by way of limitation, the conductive material of tracks may be copper or copper-based and have a width of approximately 100 µm or less. As another example, the conductive material of tracks may be silver or silver-based and have a width of approximately 100 µm or less. In particular embodiments, tracks may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks, touch sensor 130 may include one or more ground lines terminating at a ground connector (which may be a bond pad) at an edge of the substrate of touch sensor 130 (similar to the tracks described above).

In some embodiments, bond pads 152, 154, and 160 may be implemented using conductive material, such as copper and may be located along one or more edges of the substrate, outside the touch-sensitive area(s) of touch sensor 130. Bond pads 152, 154, and 160 may be implemented as tracks. Bond pads 152 may be situated coincident to bond pads 154 such that each pair of coincident bond pads 152 and 154 effectively form a parallel plate capacitor. Bond pads 152 and 154 may be arranged such that the capacitance between coincident bond pads 152 and 154 is greater (e.g., at least ten times greater) than the capacitance between electrodes on one side of touch sensor 130 and electrodes on another side of touch sensor 130. In some embodiments, tracking may be placed on multiple sides of touch sensor 130 such that the tracking is coincident on the multiple sides of touch sensor 130 and such that the tracking is coupled to coincident bond pads 152 and 154. This may increase the surface area of the parallel plate capacitor formed by bond pads 152 and 154 as well as the coincident tracking.

In some embodiments, it may be desirable to have the voltage across coincident bond pads 152 and 154 relatively small and close to electrical ground during charge cycles as compared to the voltage across electrodes on one side of touch sensor 130 and electrodes on another side of touch sensor 130. As an example, this may be beneficial in that user touch interference may be reduced or avoided when the user touches a portion of a device incorporating system 100 that is not cover 110 but at a location where the touch may still affect the electric field around touch sensor 130 (e.g., when the user touches a frame or bezel surrounding cover 110 underneath which lies aspects of touch sensor 130, such as tracks or electrodes). Bond pads 152 and 154 may be arranged such that signals from touch sensor 130 received by bond pads 152 may be capacitively transmitted to bond pads 154.

Suitable variations to the configuration depicted in FIG. 1 are contemplated. For example, in some embodiments, touch sensor 130 may be implemented as a single-sided touch sensor with electrodes aligned in multiple axes being present on the same side of touch sensor 130 (e.g., the side of touch sensor 130 that faces cover 110). As an example, bond pads 152 may be present on the same side touch sensor 130 that includes the electrodes and bond pads 152 may be coupled to those electrodes. Bond pads 154 may be present on a different side of touch sensor 130 (e.g., the side of touch sensor 130 that does not face cover 110) and be capacitively coupled to bond pads 152. Circuit 170 may be disposed on or near the side of touch sensor 130 that includes bond pads 154 (e.g., the side of touch sensor 130 that does not face cover 110) and may be coupled to bond pads 154. In some embodiments, this may allow signals to be sent from circuit 170 to electrodes on touch sensor 130 and signals to be received by circuit 170 from electrodes on touch sensor 130.

One or more of the embodiments discussed above may provide one or more advantages. For example, capacitively coupling bond pads 152 and 154 may allow for the attachment of circuit 170 onto one side of touch sensor 130 as opposed to having circuit 170 be attached to multiple sides of touch sensor 130. Having circuit 170 present on multiple sides of touch sensor 130 may increase the number of bonding operations (e.g., Anisotropic Conduction Film (ACF) bonding operations) used in manufacturing system 100 which may increase manufacturing costs and manufacturing time. Further, bonding circuit 170 to multiple sides of touch sensor 130 may cause the substrate of touch sensor 130 to crease and may lead to damage to the electrodes of touch sensor 130. For example, bond pads on the surface of touch sensor 130 that interfaces with cover 110 may not have adhesive. This may cause a lack of support that leads to creasing of touch sensor 130 during bonding, due to the weight of circuit 170, or due to displacement caused by circuit 170. In addition, having circuit 170 present on multiple sides of touch sensor 130 may lead to voids or gaps between cover 110 and touch sensor 130. Such voids or gaps may allow moisture ingress and cause reliability failures. Some forms of manufacturing system 100 may not allow for circuit 170 to be present on the side of touch sensor 130 that interfaces with cover 110. For example, in-mold lamination (IML) may be used to manufacture system 100 but may encapsulate the surface of touch sensor 130 that interfaces with cover 110 in polycarbonate material (e.g., poly(methyl methacrylate) (PMMA)) in a manner that prevents attaching circuit 170 to that surface of touch sensor 130. Having circuit 170 attached to one side of touch sensor 130 may allow for manufacturing processes such as IML. As such, in some embodiments, capacitively coupling bond pads 152 and 154 may allow for (or make more feasible) the use of dual-layer touch sensors when manufacturing system 100 using IML.

Figure 2:
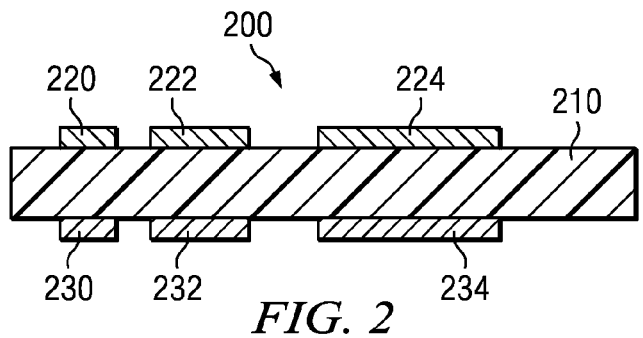
FIG. 2 illustrates one embodiment of a system with increased capacitance between bond pads attached to different sides of a sensor based on the width of the bond pads.

FIG. 2 illustrates one embodiment of system 200 with increased capacitance between bond pads attached to different sides of a touch sensor based on the area of the bond pads. System 200 includes touch sensor 210 and bond pads 220, 222, 224, 230, 232, and 234. Bond pads 220, 222, and 224 may be electrically coupled to electrodes present on touch sensor 210. Bond pads 230, 232 and 234 may be capacitively coupled to bond pads 220, 222, and 224, respectively. In some embodiments, signals present at bond pads 220, 222, and 224 may be capacitively transmitted to bond pads 230, 232, and 234, respectively. Touch sensor 210 may be configured to detect touches on a device of which system 200 is a part. Signals indicative of the detected touches may be transmitted to processing elements (e.g., circuitry or other processing components) using bond pads 220, 222, 224, 230, 232, and 234. Bond pads 220, 222, 224, 230, 232, and 234 may have larger areas than bond pads 152 and 154 of FIG. 1. In some embodiments, the increased areas of bond pads 220, 222, 224, 230, 232, and 234 may lead to increased capacitance between coincident bond pads attached on different side of touch sensor 210 as compared to the capacitance between bond pads 152 and 154 of FIG. 1. This may allow for more reliable and/or accurate transmission of signals present on electrodes of touch sensor 210. The increased area of bond pads 220, 222, 224, 230, 232, and 234 may be implemented by varying the length and/or width of bond pads 220, 222, 224, 230, 232, and 234. In some embodiments, bond pads 220, 222, 224, 230, 232, and 234 may not have uniform shapes (e.g., they may each have different areas, lengths, and/or widths).

In some embodiments, touch sensor 210 may be implemented using one or more of the examples discussed above with respect to touch sensor 130 of FIG. 1. Bond pads 220, 222, 224, 230, 232, and 234 may be implemented using one or more of the examples discussed above with respect to bond pads 152, 154, and 160 of FIG. 1.

Figure 3:
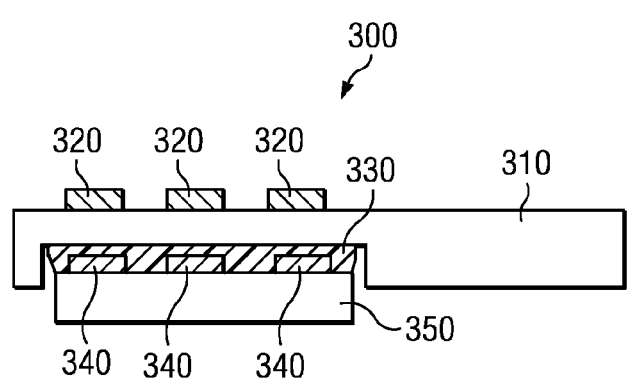
FIG. 3 illustrates one embodiment of a system with increased capacitance between bond pads attached to different sides of a sensor based on a modification of the sensor.

FIG. 3 illustrates one embodiment of a system 300 with increased capacitance between bond pads attached to different sides of a touch sensor based on a modification of the touch sensor. System 300 includes touch sensor 310. Coupled to electrodes present on touch sensor 310 are bond pads 320. A portion of touch sensor 310 has been modified such that the dielectric separation between bond pads 320 and 340 is reduced. This may be accomplished, in some embodiments, by reducing the distance between the sides of touch sensor 310 to which bond pads 320 and 340 are attached. For example, a portion of touch sensor 310 may be removed. As another example, the portion of touch sensor 310 to which bond pads 320 and 340 are attached may be thinner than other portions of touch sensor 310. As another example, the portion of touch sensor 310 to which bond pads 320 and 340 are attached may be compressed (e.g., crushed) while other portions of touch sensor 310 are not compressed. Bond pads 340 of circuit 350 are attached to touch sensor 310 using adhesive 330. In some embodiments, touch sensor 310 may be modified In some embodiments, signals representing touch events detected by electrodes of touch sensor 310 may be capacitively transmitted from bond pads 320 to coincident bond pads 340. In some embodiments, system 300 may provide a greater capacitance between coincident bond pads 320 and 340 than coincident bond pads 152 and 154 of FIG. 1 because the distance between bond pads 320 and 340 may be smaller than the distance between bond pads 152 and 154. System 300 may also provide for the reduction in size of bond pads 320 and/or 340 as compared to bond pads 152, 154, and 180 of FIG. 1 because the reduction in capacitance that results from the bond pads with smaller surface areas may be offset by the increase in capacitance that results from reducing the distance between coincident bond pads.

In some embodiments, touch sensor 310 may be implemented using the examples discussed above with respect to touch sensor 130 of FIG. 1. Bond pads 320 and 340 may be implemented using the examples discussed above with respect to bond pads 152, 154, and 180 of FIG. 1. Adhesive 330 may be implemented using the examples discussed above with respect to adhesives 120 and 140 of FIG. 1. Circuit 350 may be implemented using examples discussed above with respect to circuit 170 of FIG. 1.

Figure 4:
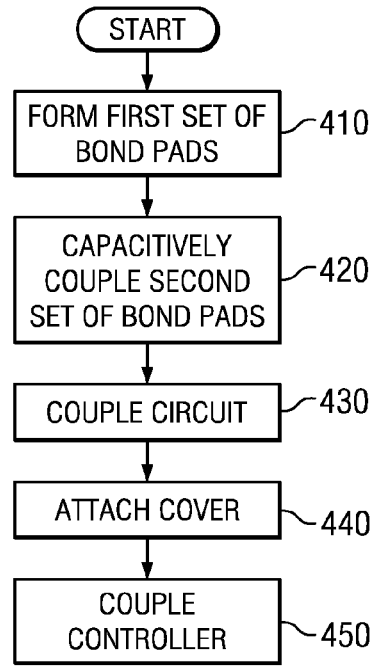
FIG. 4 illustrates one embodiment of manufacturing a touch sensing system.

FIG. 4 illustrates one embodiment of manufacturing a touch sensing system. In general, the steps illustrated in FIG. 4 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1-3.

The method may start at step 410, where, in some embodiments, a first set of bond pads may be formed on a touch sensor. The touch sensor may include electrodes that are configured to detect touches on a cover that is near the touch sensor. Each bond pad in the first set of bond pads may be formed in FLM or printed in silver such that electrodes of the touch sensor may be coupled to one or more components that process signals received from the electrodes or provide signals to the electrodes. The touch sensor may have electrodes on more than one side of the touch sensor and bond pads may be formed on more than one side of the touch sensor. As an example, this step may be used to form bond pads 152 and 160 to touch sensor 130 of FIG. 1.

At step 420, in some embodiments, a second set of bond pads may be capacitively coupled to the first set of bond pads. This step may be performed during or after step 410. The second set of bond pads may be formed on the touch sensor. Bond pads formed at step 420 may be formed in FLM or printed in silver. Bond pads formed at step 420 may be capacitively coupled to some or all of the bond pads attached at step 410. Bond pads attached at step 420 may be formed on a different side of the touch sensor than some of the bond pads attached at step 410 but be coincident with the bond pads attached at step 410 that are on the different side of the touch sensor (thereby being capacitively coupled to those bond pads). Bond pads formed at step 420 may not be electrically coupled to electrodes of the touch sensor.

In some embodiments, portions of the touch sensor may be removed before or during capacitively coupling bond pads at this step. For example, an Excimer laser may be used to remove portions of the touch sensor that correspond to an area where bond pads have been attached at step 410. An nonconductive adhesive or ACF may then be used to attach bond pads of a circuit at step 420 to the touch sensor where the portion has been removed such that those bond pads are coincident with and capacitively coupled to the bond pads attached to the touch sensor at step 410. An example of this is described above and depicted in FIG. 3.

At step 430, in some embodiments, a circuit may be coupled to at least some of the bond pads coupled at steps 410 and 420. Examples of circuits that may be coupled at this step are given above with respect to circuit 170 of FIG. 1 and circuit 350 of FIG. 3. The circuit may be coupled to the bond pads attached at step 420 but only some of the bond pads attached at step 410. The bond pads that were attached at step 410 but do not have corresponding bond pads attached at step 420 may be coupled to the circuit at step 430. At this step, in some embodiments, the circuit may only be arranged on one side of the touch sensor. For example, the circuit may only be directly coupled to bond pads that are located on one side of the touch sensor. The circuit may be coupled using anisotropic conduction film bonding.

At step 440, in some embodiments, a cover may be attached. Examples of covers may be attached at step are given above with respect to cover 110 of FIG. 1. A cover may be attached using an adhesive to the touch sensor. Examples of adhesives that may be used at step are given above with respect to adhesive 120 of FIG. 1. The cover attached at this step may be the element that receives touches such as for example, a glass or plastic face of a touch input device (e.g., a phone, tablet, or instrument panel). In-mold lamination (IML) may be used at this step to form the cover. In some embodiments, having the touch sensor coupled to the circuit on the surface opposite to the surface that interfaces with the cover may result in less expensive and faster manufacturing. For example, the surface of the touch sensor that interfaces with cover may be completely covered with optically clear adhesive without the need of cutouts in the adhesive because the circuit is not coupled to the touch sensor on this surface.

This may also obviate any alignment procedures performed when making such cutouts in the adhesive and laminating to the touch sensor.

At step 450, in some embodiments, a controller may be coupled to the circuit attached at step 430, at which point the method may end. The controller may be configured to analyze signals generated by the touch sensor and/or may be configured to generate signals to be sent to the touch sensor. For example, the controller may send a dry signal to certain electrodes of the touch sensor and may analyze the signals received from electrodes that did not receive the dry signal to determine whether touch has occurred. Examples of the controller coupled at step 450 are discussed below with respect to control unit 580 of FIG. 5.

The steps recited above with respect to FIG. 4 may be performed in any suitable order. For example, step 440 may occur before step 430 or step 420. As another example, step 450 may occur before step 440. As another example, certain aspects of step 420 may be performed at the same time as step 410. For example, at step 410 bond pads may be applied to a first side of the touch sensor and the bond pads applied to the second side of the first touch sensor at step 410 may be applied at the same time as bond pads that are capacitively coupled to the bond pads on the first side of the touch sensor at step 420.

Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
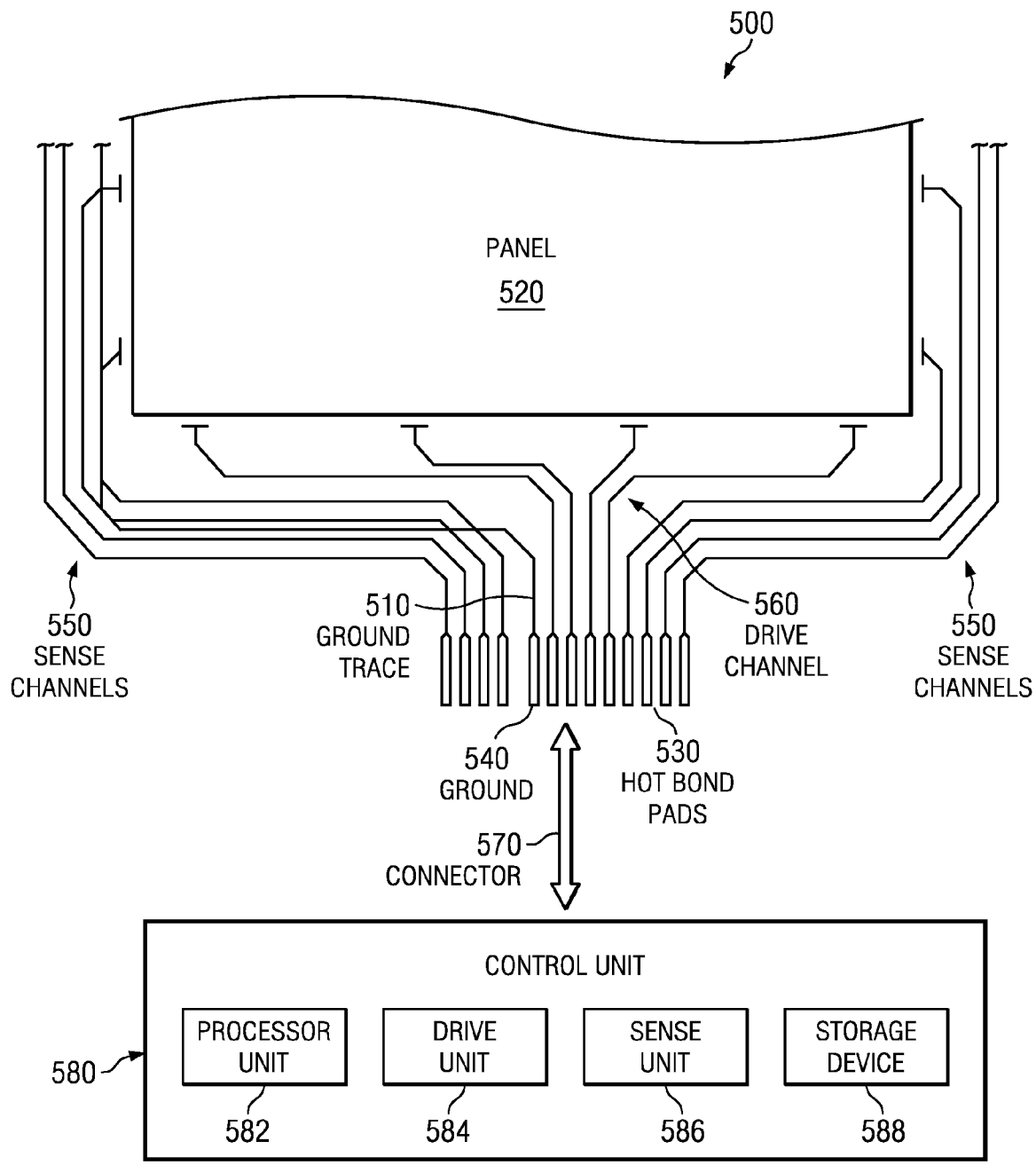
FIG. 5 illustrates an example touch-screen system.

FIG. 5 illustrates an example touch-screen system 500. System 500 includes touch sensitive panel 520 that is coupled to hot bond pads 530 and ground 540 using ground trace 510, sense channels 550, drive channels 560. The drive and sense channels 550 and 560 are connected to a control unit 580 via a connector 570. In the example, the traces forming the channels have hot bond pads 530, to facilitate electrical connection via the connector 570. As an example, control unit 580 may cause a drive signal to be sent to panel 520 via drive channel 560. Signals detected in panel 520 may be sent to control unit 580 via sense channels 550. As discussed further below, control unit 580 may process the signals to determine whether an object has contacted panel 520 or is in proximity to panel 520.

In particular embodiments, panel 520 may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with conductive material forming drive and sense electrodes. Panel 520 may also include a second layer of OCA and another substrate layer (which may be made of PET or another suitable material). The second layer of OCA may be disposed between the substrate with the conductive material making up the drive and sense electrodes and the other substrate layer, and the other substrate layer may be disposed between the second layer of OCA and an air gap to a display of a device including a touch sensor and a controller. As an example only and not by way of limitation, the cover panel may have a thickness of approximately 1 mm; the first layer of OCA may have a thickness of approximately 0.05 mm; the substrate with the conductive material forming the drive and sense electrodes may have a thickness of approximately 0.05 mm (including the conductive material forming the drive and sense electrodes); the second layer of OCA may have a thickness of approximately 0.05 mm; and the other layer of substrate disposed between the second layer of OCA and the air gap to the display may have a thickness of approximately 0.5 mm. Although this disclosure describes a particular number of particular layers made of particular materials and having particular thicknesses, this disclosure contemplates any suitable mechanical stack with any suitable number of any suitable layers made of any suitable materials and having any suitable thicknesses. In particular embodiments, panel 520 may be implemented using the embodiments disclosed above with respect to FIGS. 1-3.

In particular embodiments, control unit 580 may be one or more integrated circuits (ICs)—such as for example general-purpose microprocessors, microcontrollers, programmable logic devices or arrays, application-specific ICs (ASICs), tangible, non-transitory, computer-readable storage media—on a flexible printed circuit (FPC). Control unit 580 may include processor unit 582, drive unit 584, sense unit 586, and storage device 588. Drive unit 584 may supply drive signals to the drive electrodes of panel 520. Control unit 580 may supply drive signals to the drive electrodes of panel 520. Sense unit 586 may sense charge at the capacitive nodes included in panel 520 and provide measurement signals to processor unit 582 representing capacitances at the capacitive nodes. Processor unit 582 may control the supply of drive signals to the drive electrodes by drive unit 584 and process measurement signals from sense unit 586 to detect and process the presence and location of a touch or proximity input within the touch-sensitive area(s) of panel 520. Processor unit 582 may also track changes in the position of a touch or proximity input within the touch-sensitive area(s) of panel 520. Storage device 588 may store programming for execution by processor unit 582, including programming for controlling drive unit 584 to supply drive signals to the drive electrodes, programming for processing measurement signals from sense unit 586, and other suitable programming, where appropriate. Although this disclosure describes a particular control unit 580 having a particular implementation with particular components, this disclosure contemplates any suitable control unit having any suitable implementation with any suitable components.

Depending on the specific features implemented, particular embodiments may exhibit some, none, or all of the following technical advantages. Manufacturing of touch sensitive systems (e.g., touch screens) may be performed faster. Manufacturing of touch sensitive systems (e.g., touch screens) may be performed at a lower cost than conventional techniques. Increased yield may be realized during manufacturing. Tooling for manufacturing may become more simplified. Moisture ingress in touch sensitive systems (e.g., touch screens) may be reduced or eliminated. The reliability of an interface between a touch sensor and processing components may be enhanced. Other technical advantages will be readily apparent to one skilled in the art from the preceding figures and description as well as the proceeding claims. Particular embodiments may provide or include all the advantages disclosed, particular embodiments may provide or include only some of the advantages disclosed, and particular embodiments may provide none of the advantages disclosed.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a touch sensor comprising a first set of electrodes located on a first side of the touch sensor;
   a first set of bond pads located on the first side of the touch sensor and electrically coupled to the first set of electrodes;
   a second set of bond pads capacitively coupled to the first set of bond pads, each bond pad of the second set of bond pads coincident with a bond pad of the first set of bond pads;
   a circuit electrically coupled to the second set of bond pads such that signals may be communicated from the first set of bond pads to the circuit;
   a second set of electrodes located on a second side of the touch sensor; and
   a third set of bond pads located on the second side of the touch sensor, the third set of bond pads electrically coupled to the second set of electrodes and electrically coupled to the circuit such that signals may be communicated from the third set of bond pads to the circuit.

2. The system of claim 1, wherein the capacitance between the first set of bond pads and the second set of bond pads is at least ten times greater than the capacitance between the first set of electrodes and the second set of electrodes.

3. The system of claim 1, wherein:
   the first set of electrodes are arranged along a first axis; and
   the second set of electrodes are arranged along a second axis, the first and second axes being substantially perpendicular to each other.

4. The system of claim 1, wherein:
   the circuit comprises the second set of bond pads;
   the touch sensor comprises a first portion and a second portion, the distance between the first side of the touch sensor and the second side of the touch sensor in the first portion of the touch sensor being smaller than the distance between the first side and the second side in the second portion;
   the first set of bond pads is located in the first portion of the touch sensor; and
   the second set of bond pads is located in the first portion of the touch sensor.

5. The system of claim 1, wherein one or more portions of the first set of electrodes comprise indium tin oxide (ITO).

6. The system of claim 1, further comprising:
   a first tracking coupled to the first set of bond pads; and
   a second tracking coupled to the second set of bond pads, the second tracking coincident with the first tracking.

7. A method comprising:
   electrically coupling a first set of bond pads to a first set of electrodes, a touch sensor comprising the first set of electrodes, the first set of bond pads and the first set of electrodes located on a first side of the touch sensor;
   capacitively coupling a second set of bond pads to the first set of bond pads, each bond pad of the second set of bond pads coincident with a bond pad of the first set of bond pads;
   electrically coupling a circuit to the second set of bond pads such that signals may be communicated from the first set of bond pads to the circuit;
   electrically coupling a third set of bond pads to a second set of electrodes, the touch sensor comprising the second set of electrodes, the second set of electrodes and the third set of bond pads located on a second side of the touch sensor; and
   electrically coupling the third set of bond pads to the circuit such that signals may be communicated from the third set of bond pads to the circuit.

8. The method of claim 7, wherein capacitively coupling the second set of bond pads to the first set of bond pads comprises capacitively coupling the second set of bond pads to the first set of bond pads such that the capacitance between the first set of bond pads and the second set of bond pads is at least ten times greater than the capacitance between the first set of electrodes and the second set of electrodes.

9. The method of claim 7, wherein:
   the touch sensor comprises a first portion and a second portion, the distance between the first side of the touch sensor and the second side of the touch sensor in the first portion of the touch sensor being smaller than the distance between the first side and the second side in the second portion;
   the circuit comprises the second set of bond pads;
   electrically coupling the first set of bond pads to the first set of electrodes comprises situating the first set of bond pads in the first portion of the touch sensor; and
   capacitively coupling the second set of bond pads to the first set of bond pads comprises situating the second set of bond pads in the first portion of the touch sensor.

10. The method of claim 7, further comprising:
coupling a first tracking to the first set of bond pads; and
coupling a second tracking to the second set of bond pads, the second tracking coincident with the first tracking.

11. A system comprising:
a first set of bond pads electrically coupled to a first set of electrodes, the first set of electrodes comprised by a touch sensor, the first set of bond pads and the first set of electrodes located on a first side of the touch sensor;
a second set of bond pads capacitively coupled to the first set of bond pads, each bond pad of the second set of bond pads coincident with a bond pad of the first set of bond pads;
a second set of electrodes located on a second side of the touch sensor;
a third set of bond pads located on the second side of the touch sensor, the third set of bond pads electrically coupled to the second set of electrodes; and
wherein the second set of bond pads is electrically coupled to a circuit such that signals may be communicated from the first set of bond pads to the circuit and the third set of bond pads are electrically coupled to the circuit such that signals may be communicated from the third set of bond pads to the circuit.

12. The system of claim 11, wherein the capacitance between the first set of bond pads and the second set of bond pads is at least ten times greater than the capacitance between the first set of electrodes and the second set of electrodes.

13. The system of claim 11, wherein:
the first set of electrodes are arranged along a first axis; and
the second set of electrodes are arranged along a second axis, the first and second axes being substantially perpendicular to each other.

14. The system of claim 11, wherein:
the circuit comprises the second set of bond pads;
the touch sensor comprises a first portion and a second portion, the distance between the first side of the touch sensor and the second side of the touch sensor in the first portion of the touch sensor being smaller than the distance between the first side and the second side in the second portion;
the first set of bond pads is located in the first portion of the touch sensor; and
the second set of bond pads is located in the first portion of the touch sensor.

* * * * *